United States Patent [19]

Teddington, Jr., deceased et al.

[11] Patent Number: 5,645,940
[45] Date of Patent: Jul. 8, 1997

[54] SHATTER-RESISTANT GLASS HAVING POLYESTER LAYERS

[76] Inventors: Charles J. Teddington, Jr., deceased, late of West Orange, N.J.; by Charles E. Teddington, IV, administrator, 165 Majorca Cir., Sacramento, Calif. 95823

[21] Appl. No.: 455,316

[22] Filed: May 31, 1995

[51] Int. Cl.$^6$ ........................................ B32B 9/00
[52] U.S. Cl. ..................... 428/430; 428/332; 428/339; 428/46; 428/440; 428/441; 156/99; 156/297; 156/285; 156/103
[58] Field of Search ................... 428/138, 34, 216, 428/40, 334, 335, 336, 424.2, 458, 426, 430, 480, 354, 332, 432, 46, 49, 339, 423.7, 440, 441; 156/99, 297, 285, 103

[56] References Cited

U.S. PATENT DOCUMENTS

| | | |
|---|---|---|
| 4,028,475 | 6/1977 | Willdorf . |
| 4,072,779 | 2/1978 | Knox et al. . |
| 4,704,174 | 11/1987 | Valimont ........................ 428/138 |
| 4,943,484 | 7/1990 | Goodman . |
| 4,952,459 | 8/1990 | Thatcher . |

*Primary Examiner*—Patrick Ryan
*Assistant Examiner*—Patrick Jewik
*Attorney, Agent, or Firm*—John P. O'Banion

[57] ABSTRACT

A layer of glass, and an optically clear or transparent coating layer bonded to at least one surface of the glass layer by an interposed layer of optically clear adhesive having a peel strength of at least 3,000 grams per square inch. The coating layer generally includes a plurality of polymeric plies or strata, which are preferably made of a polyester material. The adhesive layer is preferably a pressure sensitive acrylic resin. The coating layer preferably includes an ultraviolet absorbing polyester ply, a reflective polyester ply which will generally include a metallized surface, and an outermost scratch resistant ply that prevents scratching of the coating layer which will reduce optical transparency. The coating layer may additionally include a protective polyester ply adjacent to the metallized surface of the reflective ply.

19 Claims, 2 Drawing Sheets

FIG. − 1

SHATTER-RESISTANT GLASS HAVING POLYESTER LAYERS

BACKGROUND OF THE INVENTION

1. Field of the Invention

The invention pertains generally to laminated glass structures, and more particularly to a shatter-resistant glass laminate for use in architectural applications.

2. Description of the Background Art

A variety of shatter-proof glass laminates and assemblies are known and used, particularly in the automotive industry. These glass constructions typically comprise two layers of plate glass bonded together by an interlayer of adhesive such as polyvinyl butyral resin. For example, U.S. Pat. No. 4,943,484 discloses a solar control glass assembly and method of making the same wherein two glass layers are bonded together by a polyvinyl butyral layer, and an induced transmission filter is bonded to one of the glass layers. U.S. Pat. No. 4,072,779 discloses a birefringent polyester film which may be bonded to a glass sheet by a layer of polyvinyl butyral adhesive. The cost involved in manufacture of such glass laminate structures, however, generally precludes their use in residential and commercial structure applications.

Glass laminate structures for architectural use are also known. For example, U.S. Pat. No. 4,943,484 discloses a security film for shatter proofing windows, wherein a plurality of polyester strata are bonded together as a film which is applied to window glass. U.S. Pat. No. 4,952,459 discloses a glass sheet and laminate at one side thereof which includes a flexible web of two polyester films bonded together which is adhered to a glass sheet on one or both sides. These lamination arrangements are generally expensive to manufacture, do not provide for enhanced protection against ultraviolet radiation, and do not necessarily meet the national standard for safety glazing materials for building use in the United States.

Accordingly, there is a need for a shatter resistant-glass for architectural applications which is simple and inexpensive to manufacture, which provides enhanced protection from ultraviolet radiation, and which meets the national test standard for shatter-resistant glass for use in building construction. The present invention satisfies these needs, as well as others, and generally overcomes the deficiencies found in the background art.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The subject invention pertains to a shatter resistant glass which is easy and inexpensive to manufacture, which meets the national test standard for residential safety glass, and which provides protection from ultraviolet or other radiation.

In general terms, the invention comprises a sheet or layer of glass, and an optically clear or transparent coating layer bonded to at least one surface of the glass layer by an interposed layer of optically clear adhesive having a peel strength of at least 3,000 grams per square inch. The coating layer generally includes a plurality of polymeric plies or strata, which are preferably made of a polyester material.

By way of example and not of limitation, the adhesive layer is preferably a pressure sensitive acrylic resin, which generally has a thickness of between about one mil or 0.001 inch and about 2.5 mil or 0.0025 inch in order to have the required peel strength of 3,000 grams per square inch. The coating layer preferably includes an ultraviolet absorbing polyester ply, a reflective polyester ply which will generally include a metallized surface, and an outermost scratch resistant ply that prevents scratching of the coating layer which will reduce optical transparency. The coating layer may additionally include a protective polyester ply adjacent to the metallized surface of the reflective ply to prevent metal loss.

The shatter resistant glass comprising the present invention is suitable for window applications in commercial and residential building structures. The shatter resistant quality of the glass provides a safety and security glazing material which greatly reduces the risk of injuries due to sharp portions of broken glass which may otherwise be caused by vandalism, accidental breakage, violent storms and earthquakes.

The term "peel strength" is used to describe the measured force needed to separate material substrates. In most instances and, especially herein, the peel strength of the adhesive ply is crucial to the creation of the shatter-resistant glass. In this respect, it has been found that the bonding of the coating layer to the glass layer by means of a pressure sensitive acrylic adhesive increases the tensile strength of each substrate (i.e. glass and coating) markedly. Through testing, it has been determined that the peel strength of the adhesive should be at least 3000 grams per square inch for a ⅛ inch thick float glass layer in order to separate the adhesive ply from the glass layer with the peel strength increasing as the thickness of the glass layer increases. The desired impact resistance of the glass does not require the use of a metallized layer, an ultraviolet light blocker ply, or a scratch-resistant ply in order to attain the specified strengths related above to render the glass shatter-resistant.

The shatter-resistant glass can be mounted in any suitable manner in a frame for use as a window for residential purposes. In this respect, the shatter-resistant qualities of the glass provides a safety/security glazing material for deterring acts of violence due, for example, to vandalism, accidental glass breakage, violent storms, earthquakes and the like while also greatly reducing the risk of glass-related injuries.

An object of the invention is to provide a shatter resistant glass which is easy and inexpensive to manufacture.

Another object of the invention is to provide a shatter resistant glass which meets the national test standard for shatter-resistant glass for use in building construction.

Another object of the present invention is to provide a shatter proof glass which eliminates ultraviolet radiation in light transmitted through the shatterproof glass by absorbtion in a ultraviolet light blocking or absorbing layer.

Further objects and advantages of the invention will be brought out in the following portions of the specification, wherein the detailed description is for the purpose of fully disclosing the present invention without placing limits thereon.

BRIEF DESCRIPTION OF THE DRAWINGS

The present invention will be more fully understood by reference to the following drawings which are for illustrative purposes only.

DETAILED DESCRIPTION OF THE PREFERRED EMBODIMENTS

Figure 1:
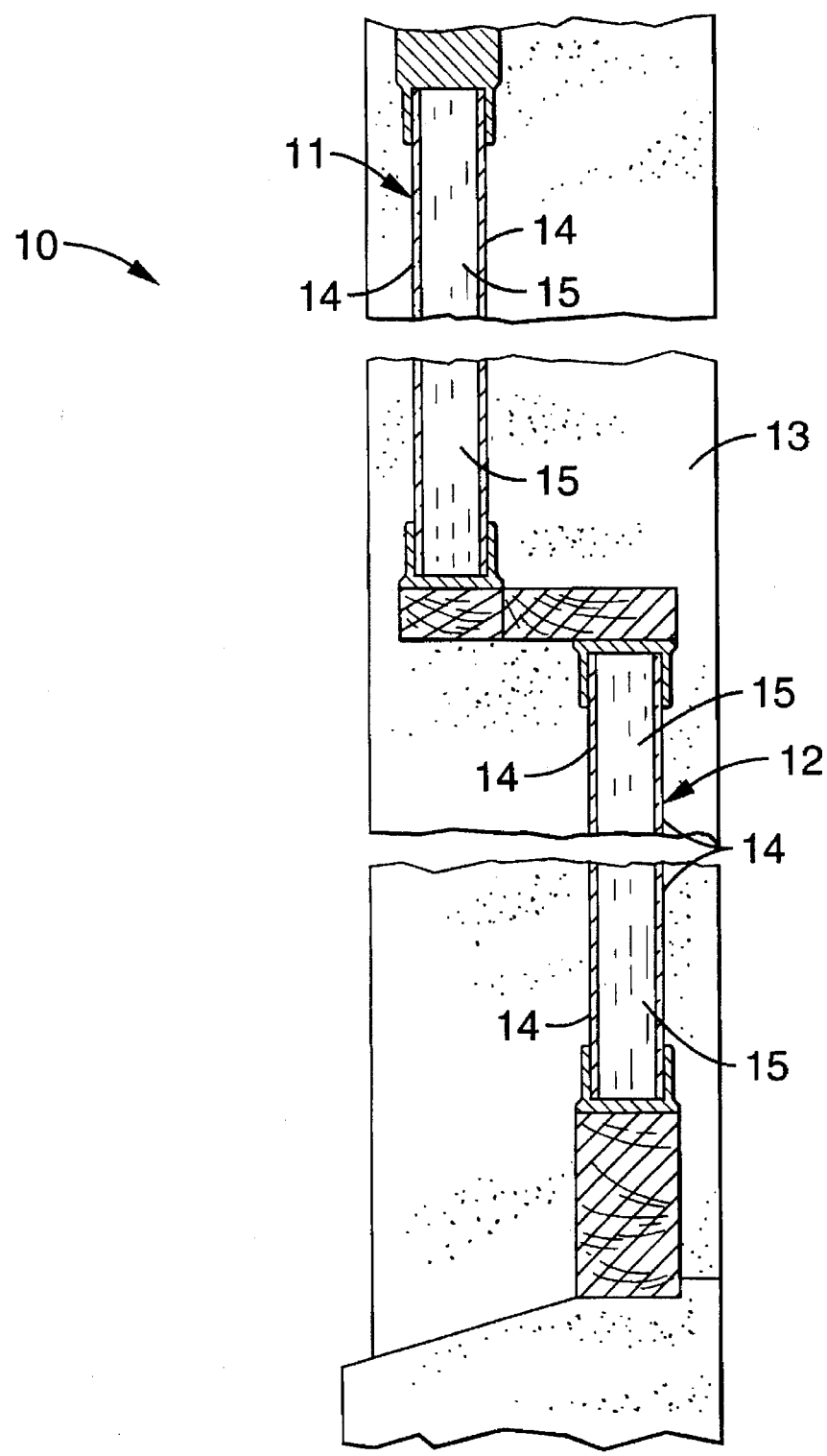
FIG. 1 is a side view in cross section of a window arrangement employing the shatter resistant glass of the present invention.

Referring to the drawings as well as the following detailed description, the shatter resistant glass comprising the present invention is described. It will be appreciated that the invention may vary as to details without departing from the general concepts as disclosed herein.

Referring first to FIG. 1, there is shown a window 10 of conventional, double-hung construction wherein the present invention may be employed. Window 10 includes generally an upper sash 11 and a lower sash 12, each of which is slidably mounted within window frame 13. Window sashes 11, 12 each include a pair of panes of shatter resistant glass 14 which enclose a space 15 and define an insulated window structure which provides thermal and acoustic insulation. It should be readily understood that the window arrangement shown in FIG. 1 is but one common example of many residential and commercial building window configurations which may utilize the present invention.

Figure 2:
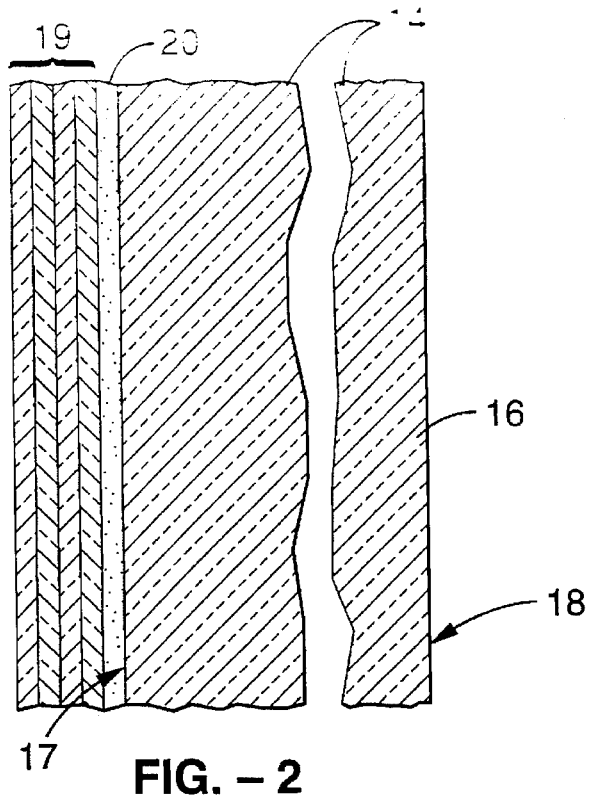
FIG. 2 is a sectional view of shatter resistant glass laminate in accordance with the present invention.

Referring next to FIG. 2, there is shown a detail of shatter resistant glass laminate 14 in cross section. Shatter resistant laminate 14 includes a glass layer 16, which preferably comprises ordinary float glass, annealed glass, or tempered glass, or any other form of transparent glass commonly used in building or dwelling construction. Glass layer 16 includes a first surface 17 and a second surface 18. Preferably, glass layer 16 has a thickness of either 0.125 inch, 0.1875 inch, or 0.25 inch (⅛, 3/16, and ¼ inch respectively), as are generally used in the building construction art, although other thicknesses for glass layer 16 may be used with the present invention.

An optically clear or transparent coating layer 19 is bonded to first surface 17 of glass layer 16 by an adhesive layer 20, which is interposed between coating layer 19 and glass layer 16. Adhesive layer 20 is an optically clear or transparent resin having a peel strength of at least 3,000 grams per square inch. Preferably, adhesive layer 20 is a pressure sensitive acrylic resin. The acrylic resin preferably comprises straight chain polyacrylate esters of varying molecular weights and ester functionalities. A commercial pressure sensitive acrylic adhesive, for example, is FLEX-MOUNT® made by Flexcon of Spencer, Mass.

The mechanical properties of adhesive layer 20 are important to the shatter proof properties of the shatter resistant glass 14. As related above, the metallized layer or ply, ultraviolet light blocking layer, and scratch resistant layer are not required to achieve the desired mechanical strength of the shatterproof glass. The background art generally relies on the thickness of one or more polyester plies adhered to glass to provide shatter resistance, and has generally not focused on the importance of adhesive strength. In order to technically measure the inherent strength or cohesion of a material bonded to a substrate, use is generally made of the Standard Peel Strength Test as described by ASTM D-882-64T.50. This peel strength test determines the amount of force (weight) required to separate adhesive layer or ply 20 from glass layer 16. Generally, the ASTM test involves separating a portion of adhesive layer 20 from glass layer 16, and adding weight until a separation of one inch between adhesive layer 20 and glass layer 16 has been achieved.

It has been determined through experimentation that the peel strength of the adhesive layer 20 should be at least 3,000 grams per square inch for a 0.125 inch (⅛ inch) layer 16 of float glass, in order to meet the national test standard for shatter-resistant glass. For thicker glass layers 16, a higher peel strength is generally required. For example, in using a float glass layer 16 of 0.25 inch (¼ inch) with the present invention, an adhesive layer 20 having a peel strength of at least 4,000 grams per inch is preferred. A peel strength of 3,000 grams per square inch can generally be obtained with an adhesive layer 20 which is about 0.001 inch or one mil in thickness, and a peel strength of 4,000 grams per square inch may be achieved with an adhesive layer 20 of about 0.0025 inch or 2.5 mil in thickness. Thus, in the preferred embodiment, adhesive layer 20 will have a thickness of between about 0.001 inch and about 0.0025 inch, and may be varied in thickness within this range depending upon the thickness of glass layer 16 used with the invention. For example, an adhesive layer 20 having a thickness of about 0.0025 inch or 2.5 mil will generally be employed with a glass layer 16 of 0.25 inch thickness, and an adhesive layer 20 with thickness of about 0.001 inch or one mil will generally be employed with a glass layer 16 of 0.125 inch thickness. Glass layers 16 of intermediate thicknesses between 0.125 and 0.25 inch, such as 3/16 inch or 0.1875 inch glass, will use adhesive layers 20 of intermediate thickness.

An adhesive layer 20 which has thickness greater than 0.0025 inch may be used in the invention for higher peel strengths. However, optical transparency is sacrificed as adhesive layer thickness is increased, and compliance with national test standards is achieved with the adhesive layer thicknesses related above.

Figure 3:
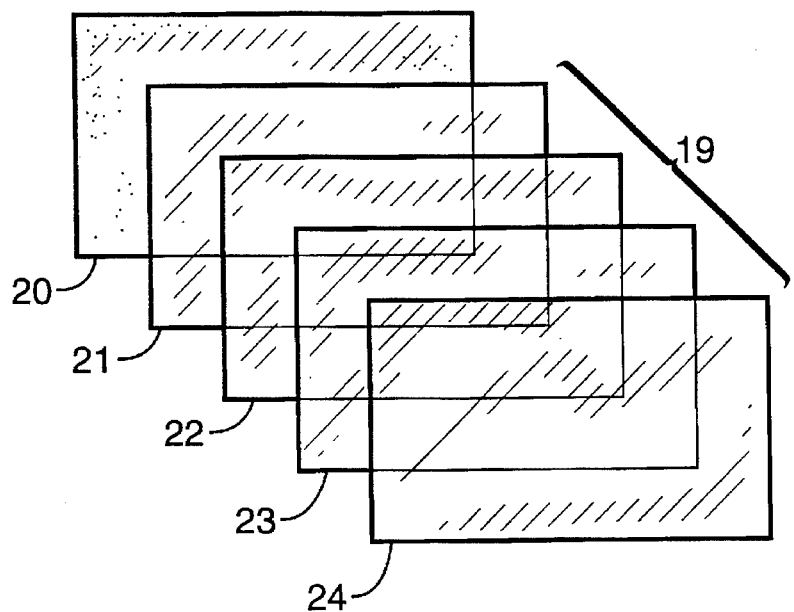
FIG. 3 is an exploded view of the coating layer and adhesive layer of the present invention showing each individual ply separately.

Referring to FIG. 3 as well as FIG. 2, coating layer 19 generally comprises a plurality of plies or strata of polymeric material. The number and type of plies may be varied depending upon the application of the shatter resistant glass and particular types of properties, such as tinting, ultraviolet blocking, reflecting, and scratch resistance. Coating layer 19 will preferably have high optical clarity or transparency regardless of the number and types of plies included therein. The polymeric material comprising the individual plies is preferably a polyester such as polyethylene terephthalate (PET), or a polyethylene terephthalate-butylene terephthalate polymer. A commercially available polyester material of this type, for example, is MYLAR® from Du Pont Co., of Wilmington Del. The overall combined thickness of adhesive layer and coating layer will preferably be in the range of about 0.006 inch or six mil to about 0.014 inch or fourteen mil, depending on the peel strength of the adhesive layer 20 required as related above, and the number of plies included in coating layer.

Coating layer 19 preferably includes an ultraviolet (UV) absorbing or blocking ply or layer 21 to eliminate ultraviolet light. The ultraviolet blocking ply 21 may comprise a sandwich of a 0.001 inch thick layer of UV blocking material between two polyester plies of about 0.001 inch in thickness, or 0.003 inch (three mil) total thickness for ply 21. This ply also may comprise a polyester ply which has been doped or plasticized with suitable broad band UV absorbers. Preferably, methoxy-, dimethoxy-, and trimethoxy- benzoic acid esters, or combinations thereof, are used as UV absorbers. Amino benzoic acid esters are also contemplated as UV absorbers, but these materials may undergo discoloration due to oxidation over time, thus reducing the overall optical transparency of shatter resistant glass 14.

Coating layer 19 also preferably includes a reflective ply or layer 22 which comprises a polyester ply with a metallized surface (not shown), such as LLUMAR®, for example, made by Martin Processing, of Martinsville, Va., is employed for reflective ply 22. Reflective ply 22 should preferably have a thickness of between about 0.0005 inch (one half mil) and 0.002 inch (two mil), with a metallized layer (not shown) on one side of the polyester ply which is generally in the range of one hundred to three hundred angstroms in thickness. The metallized layer is preferably aluminum, but may be gold, silver, copper, or other metal or metal oxide. The metallized layer may be deposited on ply 22 by sputtering, vapor deposition, or other means commonly used in the art. Reflective ply 22 provides for thermal insulation by reducing solar gain or transmission through shatter resistant glass 14, while still providing optical transparency.

A protective layer or ply 23 may also be included in coating layer 19. Protective ply 23 is positioned adjacent to the metallized layer on reflective ply 22 to prevent loss of metal. Protective ply 23 is preferably made of polyester, and preferably has a thickness of between about 0.001 inch (one mil) and about 0.002 inch (two mil).

Also provided with coating layer 19 is a scratch resistant ply or layer 24, which is the outermost ply in coating 19 relative to adhesive layer 20 and glass layer 16. Scratch resistant ply 24 is preferably made of one or more layers of polyester, and contains an outer abrasion resistant coating (not shown) on the outermost side of ply 24. The abrasion resistant coating may be prepared, for example, by treating a surface of a polyester film or sheet with Hard Coat SBC-1200 made by General Electric Co. of Schenectady, N.Y. This product is available as a mixture of twenty percent solids in alcohol, and generally requires a cure of thirty to ninety seconds at 225° F. with a suitable catalyst. Scratch resistant ply 24 can be formed by this method so as to meet a delta haze specification of less than four taber abrader tests. Another abrasion resistant coating material which may be employed with the invention is ABCITE® made by Du Pont Co. of Wilmington, Del. Scratch resistant ply 24 preferably has a thickness of between about 0.001 inch and about 0.002 inch.

The shatter proof glass comprising the present invention is generally prepared by supplying sheets of glass of conventional composition having widths of from thirty to ninety six inches, previously cut to size, together with sheets of the multi-ply optically clear polyester coating layer 19. Coating layer 19 is prepared in any suitable manner commonly used in the art whereby plies 21–24 are brought together. Plies 21–24 may include interleaved clear adhesive layers (not shown) which hold coating 19 together. Adhesive layer 20 is preferably applied to or bonded to coating layer adjacent to ply 21 or any ply other than scratch resistant ply 24, so that coating layer 19 and adhesive layer 20 may be applied together to glass layer 16. In this respect, adhesive layer 20 may be covered with a suitable release layer (not shown) for ease of handling, which is removed prior to application of coating layer 19 and adhesive layer 20 to glass layer 16. Alternatively, adhesive layer may be applied to glass layer 16, with coating layer subsequently applied thereto.

Coating layer 19 and adhesive layer 20, together with glass layer 16, are fed to an applicator constructed to apply coating layer 19 and adhesive layer 20 directly to the exposed first surface 17 of glass layer 18. An example of a commercial applicator which may be used with the present invention is the Scrim Spandrel Roller Press Applicator supplied by Capitol Glass and Aluminum Corporation of Salt Lake City, Utah. Such an applicator generally employs a pair of rollers which form an opening for the passage of the glass layer 16 and coating and adhesive layers 19, 20 therebetween while supplying a compressive force which can be adjusted to 3,000 pounds. The glass layer and coating layer may be supplied at a feed rate of about forty feet per minute, although this feed rate may be varied.

Samples of the shatter resistant glass made 14 comprising the present invention have been subjected to testing conducted in accordance with the American National Standard: Performance Specifications and Method of Test for Transparent Safety Glazing Materials Used in Building; ANSI Z97.1-1984, Section 5.1 and CPSC 16 CFR 1201, Section 5.2. These tests were carried out by ETL Testing Laboratories, Inc., of Portland, N.Y. under report numbers 492807, 492808, and 492809, dated Jul. 20, 1989.

Pursuant to these tests, each of twelve specimens, having nominal thickness ranging from ⅛ inch to ¼ inch, demonstrated compliance with Sections 5.1 and 5.2 of the American National Standard. In this respect, the glass specimens incurred numerous cracks and fissures, but no openings occurred as a result of the impact tests. In addition, one specimen of ⅛ inch nominal thickness demonstrated compliance with the impact test criterion of CPSC 16 CFR 1201 Category II, while two other specimens of 3/16 inch and ¼ inch nominal thickness did not comply with this test criterion.

Adhesive layer 20 and coating layer 19 may be applied to both first and second surfaces 17, 18 of glass layer, so that glass layer 16 is sandwiched in between a pair of adhesive and coating layers (not shown). This arrangement would provide increased shatter resistance. However, application of coating 19 and adhesive layer 20 to a single surface of glass layer 20 provides a shatter proof glass which meets the National Standard as related above.

Accordingly, the present invention provides a shatter resistant glass which is able to resist shattering in conformance with the test standards of ANSI Z97.1-1984, Section 5.1. As such, the glass reduces the risk of injury due to broken shards of glass, and further provides a deterrent to breaking and entry due to burglary or vandalism. Although the description above contains many specificities, these should not be construed as limiting the scope of the present invention but as merely providing illustrations of some of the presently preferred embodiments of the invention. Thus, the scope of the invention should be determined by the appended claims and their legal equivalents.

What is claimed is:

1. A shatter resistant glass laminate, comprising:
   (a) a glass layer, said glass layer having a thickness of approximately 0.125 inch;
   (b) an optically clear adhesive layer, said adhesive layer bonded to a surface of said glass layer, said adhesive layer having a peel strength of at least 3,000 grams per square inch, said adhesive layer having a thickness of at least 0.001 inch; and
   (c) an optically clear coating layer, said coating layer including first, second, and third polyester plies, said coating layer bonded to said adhesive layer;
   (d) said adhesive layer and said coating layer having a combined thickness of between approximately 0.004 inch and approximately 0.010 inch.

2. A shatter resistant glass laminate as recited in claim 1, wherein said adhesive layer is made of pressure sensitive acrylic resin.

3. A shatter resistant glass laminate as recited in claim 1, wherein one of said plies in said coating layer is an ultraviolet light blocking polyester ply.

4. A shatter resistant glass laminate as recited in claim 1, wherein one of said plies in said coating layer is a reflective polyester ply.

5. A shatter resistant glass laminate as recited in claim 1, wherein one of said plies in said coating layer is a scratch-resistant polyester ply.

6. A shatter resistant glass laminate as recited in claim 1, wherein said adhesive layer has a thickness of approximately 0.001 inch, and said coating layer has a thickness of approximately 0.005 inch.

7. A shatter resistant glass laminate as recited in claim 4, wherein said coating layer further comprises a fourth, protective polyester ply, said protective ply adjacent said reflective ply.

8. A shatter resistant glass laminate as recited in claim 1, wherein said adhesive layer has a peel strength of at least 4,000 grams per square inch.

9. A shatter resistant glass laminate, comprising:
   (a) a glass layer, said glass layer having a thickness of approximately 0.125 inch;
   (b) an optically clear adhesive layer, said adhesive layer having a thickness of between approximately 0.001 inch and approximately 0.0025 inch, said adhesive layer having a peel strength of at least 3,000 grams per square inch, said adhesive layer bonded to a surface of said glass layer; and
   (c) an optically clear coating layer, said coating layer bonded to said adhesive layer, said coating layer including a first, ultraviolet light blocking polyester ply, a second, reflective polyester ply, and a third, scratch-resistant polyester ply:
   (d) said coating layer having a combined thickness of between approximately 0.003 inch and approximately 0.007 inch.

10. A shatter resistant glass laminate as recited in claim 9, wherein said adhesive layer is made of pressure sensitive acrylic resin.

11. A shatter resistant glass laminate as recited in claim 9, wherein said first, ultraviolet light blocking polyester ply has a thickness of between approximately 0.001 inch and approximately 0.002 inch, said second, reflective polyester ply has a thickness of between approximately 0.0005 inch and approximately 0.002 inch, and said third, scratch-resistant polyester ply has a thickness of between approximately 0.001 inch and approximately 0.002 inch.

12. A shatter resistant glass laminate as recited in claim 11, wherein said coating layer further comprises a fourth, protective polyester ply, said protective polyester ply adjacent to said reflective ply, said protective ply having a thickness of between approximately 0.001 inch and approximately 0.002 inch.

13. A shatter resistant glass laminate as recited in claim 9, wherein said adhesive layer has a peel strength of at least 4,000 grams per square inch.

14. A shatter resistant glass laminate as recited in claim 1, wherein said shatter resistant glass laminate is made by a process comprising the steps of:
   (a) cutting said glass layer to a width of between thirty inches and ninety six inches;
   (b) preparing said coating layer from said polyester plies;
   (c) applying said adhesive layer to said coating layer;
   (d) exposing said adhesive layer to said glass layer;
   (e) providing a roller press applicator, said roller press applicator having a pair of spaced apart rollers;
   (f) adjusting said pair of rollers to supply a compressive force of about three thousand pounds; and
   (g) feeding said glass layer, adhesive layer and coating layer through said pair of rollers at a feed rate of about forty feet per minute.

15. A shatter resistant glass laminate as recited in claim 1, wherein said glass layer, said adhesive layer, and said coating layer have a combined thickness which is no greater than 0.135 inch.

16. A shatter resistant glass laminate as recited in claim 9, wherein said shatter resistant glass laminate is made by a process comprising the steps of:
   (a) supplying said glass layer, said glass layer cut to a width of between approximately thirty inches and approximately ninety six inches;
   (b) preparing said coating layer from said first, second and third polyester plies;
   (c) applying said adhesive layer to said coating layer;
   (d) exposing said adhesive layer to said glass layer;
   (e) providing a roller press applicator, said roller press applicator having a pair of spaced apart rollers;
   (f) adjusting said pair of rollers to supply a compressive force of three approximately thousand pounds; and
   (g) feeding said glass layer, adhesive layer and coating layer through said pair of rollers at a feed rate of approximately forty feet per minute.

17. A shatter resistant glass laminate as recited in claim 9, wherein said glass layer, said adhesive layer, and said coating layer have a combined thickness which is no greater than 0.135 inch.

18. A method of making a shatter resistant glass laminate, comprising the steps of:
   (a) providing a glass layer, said glass layer having a thickness of approximately 0.125 inch, said glass layer cut to a width of between approximately thirty inches and approximately ninety six inches;
   (b) preparing a coating layer from first, second and third polyester plies, said coating layer having a thickness of between approximately 0.003 inch and approximately 0.007 inch;
   (c) applying an adhesive layer to said coating layer, said adhesive layer having a thickness of approximately 0.001 inch;
   (d) exposing said adhesive layer to said glass layer;
   (e) providing a roller applicator, said roller applicator having a pair of spaced apart rollers;
   (f) adjusting said pair of rollers to supply a compressive force of approximately three thousand pounds; and
   (g) feeding said glass layer, adhesive layer and coating layer through said pair of rollers at a feed rate of approximately forty feet per minute.

19. A method of making a shatter resistant glass laminate as recited in claim 18, wherein step (b) further comprises including a fourth polyester ply in said preparing of said coating layer.

* * * * *